3,088,955
PREPARATION OF ACETYLACETONATES
FROM ORES
Raymond A. Foos, Cincinnati, Ohio, and Howard F. Gemperline, Tonawanda, N.Y., assignors to Union Carbide Corporation, a corporation of New York
No Drawing. Filed Aug. 11, 1958, Ser. No. 754,130
14 Claims. (Cl. 260—429.1)

This invention relates to the benefication of oxidic ores.

A common technique for recovering metal values from oxidic ores and concentrates comprises dissolution of the metal-bearing oxidic material in an acid solution, extraction of the metal values from the acid solution with an organic extractant and separation of the metal values from the organic phase. The metal values may be recovered in a highly purified form by this method; however, the process entails several detailed operations before the purified product is obtained.

It is an object of this invention to provide a process for recovering uranium, manganese, vanadium, copper, iron, nickel and cobalt values from oxidic sources such as low-grade oxidic ores and ore concentrates.

In the past it has been necessary to react acetylacetone (2,4-pentanedione) with metal salts such as the metal hydroxides and carbonates or to effect the double decomposition of an alkali or ammonium salt of acetylacetone with another metal sale or to retract acetylacetone with a specific metal to obtain metal acetylacetonates. These processes have certain disadvantages inherent in them in that they either require difficult reaction conditions or the recovery of the product from the reaction mixture is difficult or both.

Accordingly, it is another object of this invention to provide a process for the preparation of metal acetylacetonates directly from oxides of uranium, manganese, vanadium, copper, iron, nickel and cobalt, and particularly from their oxide ores.

Other objects will be apparent from the subsequent disclosure and appended claims.

The objects of the invention are achieved by leaching an oxide or an oxidicore of a metal selected from the group consisting of uranium, manganese, vanadium, iron, neckel, cobalt, aluminum and copper with acetylacetone (2,4-pentanedione) whereby the metal values are converted to and dissolved as metal acetylacetonates in accordance with the over-all general equation:

wherein H(P-D) is 2,4-pentanedione, (P-D) is the pentanedione radical, M is a metal or metal oxide and $n$ is the valence of M. The leach liquor contains the metal acetylacetonates dissolved in excess acetylacetone; these metal acetylacetonates may be separated by crystallization or by any other suitable means such as precipitation from the acetylacetone solution with a mineral acid.

The factors which affect the process of the present invention include time of leaching, the ratio of acetylacetone to ore employed for the leaching and the temperature at which the leaching is effected. These factors will be illustrated with the recovery of uranium values from carnotite ores.

For the maximum separation of uranium from carnotite ore (containing about 0.33 percent $U_3O_8$) it has been found that if each gram of ore is leached with about 2 milliliters of acetylacetone for about 4 hours at reflux temperature (about 129° C. at atmospheric pressure) maximum dissolution of the $U_3O_8$ is obtained. This may be illustrated by the following series of tests.

To determine the organic-to-ore ratio, 100 gram samples of carnotite ore were leached for 2 hours at a temperature of 129° C. with increasing quantities of acetylacetone. The results of these tests are shown in Table I.

Table I

| Milliliters af acetylacetone: | Percent $U_3O_8$ dissolved |
|---|---|
| 50 | 15 to 20 |
| 150 | 75 to 80 |
| 200 | 85 to 90 |

In a series of tests to determine the preferred length of time of leaching, 200 milliliters of acetylacetone were employed to leach 100 gram samples of carnotite ore containing 0.33 percent $U_3O_8$ at a temperature of approximately 129° C., the reflux temperature. The results of these tests are shown in Table II.

Table II

| Time, minutes: | Percent $U_3O_8$ dissolved |
|---|---|
| 15 | 50.5 |
| 30 | 58.0 |
| 60 | 61.0 |
| 240 | 93.5 |

To determine the most satisfactory leaching temperature 200 milliliters of acetone were employed to leach 100 gram samples of carnotite ore containing 0.37 percent $U_3O_8$ at several different temperatures. The data for these tests are shown in Table III.

Table III

| Temperature, ° C.: | Percent $U_3O_8$ dissolved |
|---|---|
| 28 | 6.8 |
| 54 | 21.6 |
| 75 | 28.4 |
| 100 | 47.5 |
| 129 (reflux temp.) | 84.0 |

In all of the foregoing examples the ore samples were comminuted to pass through a 270 mesh standard screen.

The beneficial affects obtained from the present process in recovering manganese from ores are illustrated by a series of tests wherein 50 gram samples of Essikuma ore (containing about 26 percent manganese) were reacted with varying amounts of acetylacetone at a temperature of about 100° C. The results of these tests are shown in Table IV.

Table IV

| Acetylacetone, ml.: | Percent $MnO_2$ dissolved |
|---|---|
| 75 | 84.5 |
| 100 | 90.5 |
| 150 | 93.0 |
| 200 | 93.0 |

As may be seen from the above table an acetylacetone to ore ratio in the range of 2 to 3 milliliters of acetylacetone to one gram of ore produces satisfactory results.

To determine the optimum leaching period 50 gram samples of ore were treated with 150 milliliters of acetylacetone at reflux temperature. The data are shown in Table V.

Table V

| Time, minutes: | Percent $MnO_2$ dissolved |
|---|---|
| 30 | 75.5 |
| 60 | 88.3 |
| 120 | 92.0 |
| 180 | 93.0 |

As may be seen from these data about 2 hours were found to be a suitable leaching period.

To determine the most suitable leaching temperature 50 grams of manganese ore were treated with 100 milliliters of acetylacetone for a period of about 120 minutes at varying temperatures. The results of these data are shown in Table VI.

Table VI

| Temperature, °C. | Percent MnO$_2$ dissolved |
|---|---|
| 26 | 14.5 |
| 70 | 41.7 |
| 100 | 93.0 |

As may be seen from the above data the most suitable operating temperature is about 100° C., the reflux temperature.

In a series of tests with other oxidic metal materials it was found that the reflux temperature was the most suitable temperature for leaching. The reflux temperature varies with each metal compound being leached and is determined by the compounds that are formed during the leaching.

Uranium trioxide has been found to be particularly suitable for conversion to uranium acetylacetonate, the reaction going to completion almost immediately at a temperature only slightly above room temperature. However, as with the other materials best results are obtained at reflux temperatures.

At reflux temperature manganese oxides react with acetylacetone almost to completion in about 4 hours.

When vanadium oxide was leached with acetylacetone at reflux temperature about 95 percent of the oxide was reacted in about 5 hours. In another test where the leaching was done for 24 hours it produced no substantial increase in the conversion.

When iron oxides were treated at reflux temperature for 4 hours with acetylacetone a conversion to the acetylacetonate of about 57 percent was obtained. Treatment of ferric oxide, Fe$_2$O$_3$, for 48 hours showed a conversion of 50 percent.

When copper oxide was treated for 5 hours at reflux temperature a conversion of about 66 percent was obtained whereas treatment for 8 hours produced a conversion of about 75 percent.

When nickel oxide, Ni$_2$O$_3$, was treated for three hours at reflux temperature with acetylacetone a conversion of about 12 percent was obtained. Treatment of nickel oxide with acetylacetone for 15 hours produced a conversion of 20 percent.

When cobalt oxide, Co$_2$O$_3$, was treated with acetylacetone at reflux temperature for 5 hours a conversion of about 8.4 percent was obtained whereas treatment of the oxide for 15 hours produced a conversion of 9.0 percent.

Aluminum oxide, Al$_2$O$_3$, was treated with acetylacetone at reflux temperature for 5 hours a conversion of about 2.0 percent was obtained.

As may be seen from the above data the process of the present invention is most suitable for the preparation of uranium, vanadium, copper and iron acetylacetonates and to the recovery of these metals from their oxide ores.

If it is desired to obtain the metal acetylacetonates directly in solid form the metal oxides should be treated with a stoichometric quantity of acetylacetone in accordance with the following equation:

$$2H(P\text{-}D) + M_{\frac{2}{n}}O \longrightarrow M_{\frac{2}{n}}(P\text{-}D)_3 + H_2O$$

wherein H(P-D) is 2,4-pentanedione, (P-D) is the pentanedione radical, M is a metal or metal oxide and n is the valence of M.

To illustrate, when M is ferric iron, the equation is as follows:

$$6H(P\text{-}D) + Fe_2O_3 \rightarrow 2Fe(P\text{-}D)_3 + 3H_2O$$

When uranium trioxide is being converted to the acetylacetonate, M is UO$_2$=, and the equation is:

$$2H(P\text{-}D) + (UO_2)O \rightarrow UO_2(P\text{-}D)_2 + H_2O$$

However, for the maximum recovery of the metal values from the ores, an excess of the acetylacetone should be employed; the minimum excess is that just necessary to dissolve the formed metal acetylacetonates.

As employed herein, the term reflux temperature refers to the temperature of the boiling liquid under the pressure employed in the leaching system.

What is claimed is:

1. A process for beneficiating an oxidic ore of a metal selected from the group consisting of uranium, vanadium, manganese, aluminum, copper, nickel and cobalt which comprises comminuting said ore, leaching said comminuted ore with a stoichiometric quantity of acetylacetone for the conversion of contained metal oxides to metal acetylactonates and with at least a sufficient excess to dissolve said metal acetylacetonate in a minimum quantity of acetylacetone at a temperature in the range of from about room temperature up to about the reflux temperature of acetylacetone and said metal acetylacetonate, and separating the leach liquor so produced from the leached ore whereby said leach liquor contains a substantial quantity of the oxide of said metal as a metal acetylacetonate substantially free from gangue materials.

2. A process in accordance with claim 1 wherein the ore is leached at reflux temperature.

3. A process in accordance with claim 1 wherein said metal is uranium.

4. A process in accordance with claim 1 wherein said metal is manganese.

5. A process in accordance with claim 1 wherein said metal is aluminum.

6. A process in accordance with claim 1 wherein said metal is copper.

7. A process in accordance with claim 1 wherein said metal is nickel.

8. A process in accordance with claim 1 wherein said metal is cobalt.

9. A process in accordance with claim 2 wherein said metal is uranium.

10. A process in accordance with claim 2 wherein said metal is manganese.

11. A process in accordance with claim 2 wherein said metal is aluminum.

12. A process in accordance with claim 2 wherein said metal is copper.

13. A process in accordance with claim 2 wherein said metal is nickel.

14. A process in accordance with claim 2 wherein said metal is cobalt.

References Cited in the file of this patent

C.A. 3001f, vol. 47 (1953), Abstracting, Pollack, (Kohden uber Nidda, Germany), Farbe u Lack 58, 535-5 (1952).

C.A. 1768, vol. 31, Abstracting, Puitti, Gazz. Chim. Ital. 66, 776-7 (1936).

C.A. 1877, vol. 23, Morgan and Castell, J. Chem. Soc. (1928), 3252-6.

Kurovski: "Ber." 43, 1078-79 (1910).